Jan. 31, 1967 R. F. BRADY 3,301,275
AIR RETAINING MEANS FOR WATER TANKS
Filed Feb. 10, 1964

INVENTOR.
RICHARD F. BRADY
BY
Lockwood, Woodard, Smith & Weikart
Attorneys

United States Patent Office 3,301,275
Patented Jan. 31, 1967

3,301,275
AIR RETAINING MEANS FOR WATER TANKS
Richard F. Brady, Muncie, Ind., assignor to Brady Air Controls, Inc., Muncie, Ind., a corporation of Indiana
Filed Feb. 10, 1964, Ser. No. 343,681
2 Claims. (Cl. 138—31)

This invention relates generally to water supply systems and more particularly to air retaining means for water tanks used in domestic water supply systems.

Conventional domestic water supply systems include a pump adapted to draw water from a well and a water storage tank for receiving the pump output. It is customary to utilize such tanks as a means for providing pressure whereby water may be drawn through the domestic piping system when the pump is not operating. Such pressure is created within the tank by trapped air, and the pump is automatically operated to supply sufficient water to the tank to create a range of pressure within the tank of the order of 20 lbs. to 40 lbs. per square inch.

Water supply systems of the type described have required periodical replacement of air in the supply tank because the water circulating through the tank will absorb stored air to such an extent that the tank eventually becomes completely filled with water and as a result, there is no residual air pressure within the tank. When this condition prevails, the pump starts whenever water is drawn from the tank. This results in excessive power consumption and generally unsatisfactory operation of the water supply system.

The principal object of this invention is to provide means in a domestic water supply tank for preventing absorption of air by the water in the tank and further means for preventing air from escaping from the tank when the water level recedes to the level of the tank outlet.

Another object of this invention is to provide in a water storage tank a means for sealing the water surface from appreciable contact with the air trapped within the tank.

A further object of this invention is to provide a means in a water supply tank for sealing the tank outlet when there is no water in the tank so that the tank may be precharged with air to a predetermined pressure by the tank manufacturer.

In accordance with this invention there is provided a water supply tank for domestic water systems which includes a sealing float adapted to isolate the water in the tank from the air in the tank, and a check valve adapted to close the tank outlet when the water approaches the level of said outlet and to open the outlet when the water is above said outlet.

The full nature of the invention will be understood from the accompanying drawings and the following description and claims:

Figure 1:
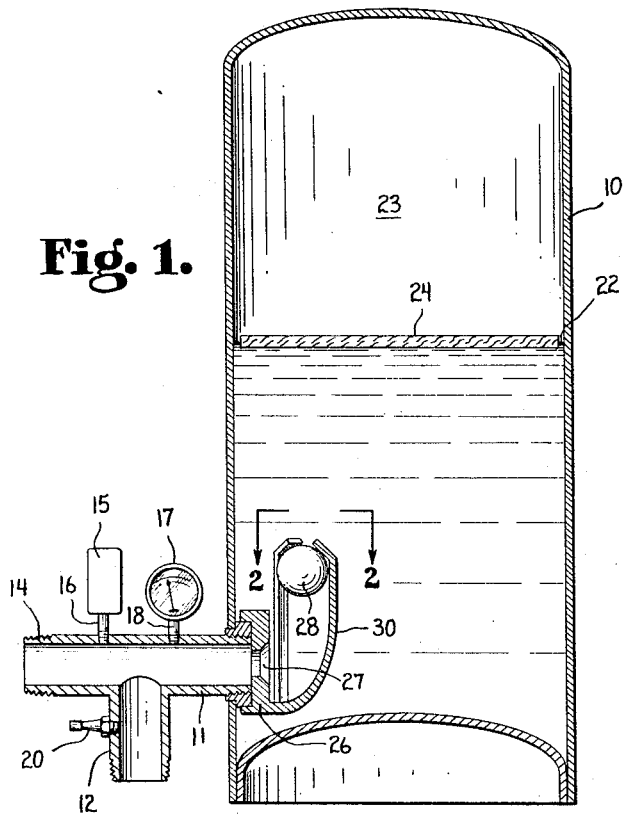
FIG. 1 is a cross sectional view of the water tank, sealing float, and check valve, as provided in accordance with this invention.
Figure 2:
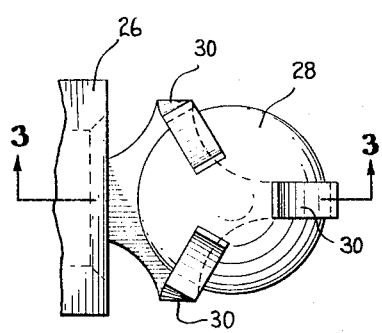
FIG. 2 is a top plan view of the check valve of FIG. 1 taken as indicated by the line 2—2 of FIG. 1.

Referring to the drawings, there is provided in accordance with this invention a conventional water storage tank 10 having a combined inlet and outlet pipe 11. A pump connection 12 provides a means whereby water may be flowed into pipe 11 and into the tank 10. The water distribution pipe system may be connected to pipe 11 at 14 whereby water may be drawn from the tank. A conventional pressure responsive switch 15 may be connected to pipe 11 by a tube 16 for controlling a conventional pump. A conventional pressure gauge 17 may also be connected to pipe 11 by the tube 18. A recharging valve 20 is provided for connection to pipe 12 so that the tank may be recharged with air as necessary.

In accordance with this invention a tank manufacturer may preload or precharge a tank with air to a pressure of 15 lbs. per square inch. A pressure switch may be set to operate a minimum pressure of 20 lbs. per square inch and a maximum pressure of 40 lbs. per square inch, thereby to maintain what is commonly called a "20–40" range of tank pressure. Precharging of the tank has been found to increase the over-all efficiency of the water system. More water is stored during each pumping cycle and, hence, more water is discharged from the tank between pumping cycles. Additionally, a sufficient supply of air remains in the tank over a much longer period of time, whereby it is necessary to recharge the tank with air after much longer periods of time. For example, conventional water systems require recharging of the tank after an interval of approximately two years. This invention prevents absorption of air by the water and extends the period between recharging to approximately six years.

When the preloaded tank is supplied with water in a 20–40 system to create an internal pressure of approximately 40 lbs. per square inch, the water lever rises to the point indicated at 22, and as will be obvious, the upper portion 23 of the tank will then contain air at a maximum pressure of approximately 40 lbs. per square inch. For preventing absorption of the air by the water there is provided a float 24 which may be formed of a floatable material such, for example, as polystyrene, or other equivalent material. The diameter of float 24 may be only slightly smaller than the inner diameter of the tank so that it may move freely upwardly and downwardly with the surface of the water. Such a float prevents contact between air and water and reduces air absorption by the water to such a degree that a water system of this type may be operated for many months without recharging the tank with air.

Figure 3:
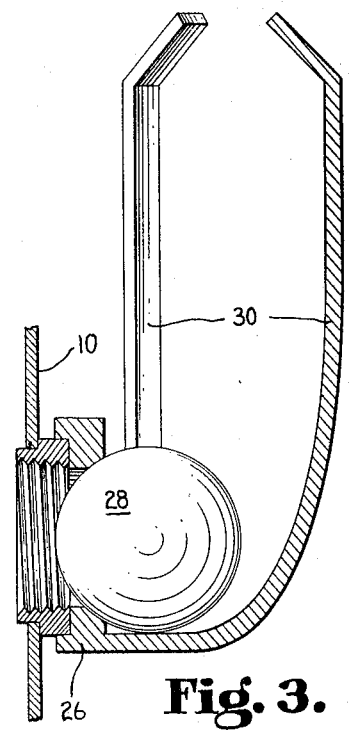
FIG. 3 is a cross sectional view of the check valve structure taken on line 3—3 of FIG. 2.

As previously stated herein, the period of efficient performance of the water system is appreciably extended by precharging the empty tank with air to a pressure of approximately 15 lbs. per square inch. This degree of precharging is not sufficient for higher pressure systems and, therefore, the degree of precharging is greater for such systems due to the higher absorption rate of air under higher pressures. In order to carry out precharging it is necessary to provide a means for preventing an escape of air from the tank when there is no water in the tank. To this end there is provided, in accordance with this invention, a check valve assembly consisting of a base portion 26 mounted to the end of pipe 11 in the manner illustrated in FIGS. 1 and 3. A valve seat 27 may be formed in the base 26 as shown, and a ball check 28 may be caged in operative relation to the valve seat by means of the caging fingers 30, which may be in the form of extensions of base 26. The ball 28 should be preferably of the floating type so that when the water level is above the valve seat 27, the ball will float out of engagement therewith and permit ingress and egress of the water.

When the water level in the tank approaches the level of the valve seat, the ball check 28 moves downwardly within the caging fingers, and the curvature of the fingers, plus outward flow of water, guides the ball into sealing engagement with the seat 27. This prevents escape of air from the tank so that a predetermined charge of air will be retained in the tank. Movement of the ball into engagement with the seat can occur when water is being withdrawn from the tank and prior to operation of the tank, and the ball will also engage the seat when the pump is running and the water level is low, and the rate of withdrawal exceeds the pump capacity. Thus, the ball check valve prevents escape of air at any time that the water level reaches a predetermined low point.

As previously mentioned, it is desirable to precharge the tank with air to a selected predetermined pressure by the manufacturer whereby the ball check valve serves the additional purpose of preventing escape of air from the tank prior to the time that it is connected to a complete water system.

From the foregoing description it will be apparent that the ball check valve, as provided in accordance with this invention, serves the dual purpose of preventing escape of air from the tank prior to the time that it is connected to a water system and during normal operation of the water system. The combination of the check valve with the float 24 extends, to a very substantial degree, the length of time during which a charge of air may be retained within the tank. This increases substantially the over-all efficiency of the water system and prevents excessive operation of the pump and its motor.

The invention claimed is:

1. In combination with a water storage tank, an aperture in said tank, and a check valve mounted over said aperture and including a check device operable, until admission of water into said tank, to hold a charge of compressed gas in said tank above atmospheric pressure, said check device being operable by application of external water pressure greater than the gas pressure in said tank to said aperture for opening said valve and admitting water into said tank, said check device having a portion spaced from the top of the tank and floatable on water admitted to said tank when the water level in the tank has risen past said aperture, and said check device thereupon becoming responsive to change of water level adjacent said aperture for opening said valve when the water level is above said aperture and for closing said valve when the water level approaches the level of said aperture for preventing flow of gas outward from said tank through said aperture, and means in the tank for guiding said check device between valve opening and closing positions.

2. The combination of claim 1 and further comprising: a float in said tank, said tank being cylindrical and said float being circular and having a diameter slightly less than the internal diameter of said tank for covering and floating on the surface of water in said tank and preventing absorption of gas by water in said tank when water is stored in said tank for dispensing through said aperture.

References Cited by the Examiner
UNITED STATES PATENTS

| | | | |
|---|---|---|---|
| 1,788,280 | 1/1931 | Dempsey | 137—399 |
| 1,865,387 | 6/1932 | Radomski | 137—399 |
| 2,731,038 | 1/1956 | Purcell | 138—30 |
| 2,796,883 | 6/1957 | Thompson | 137—399 |
| 2,979,070 | 4/1961 | Payne | 137—192 |
| 3,030,891 | 4/1962 | Taylor | 138—31 X |

LAVERNE D. GEIGER, *Primary Examiner.*

HENRY T. KLINKSIEK, M. CARY NELSON,
*Examiners.*